(12) United States Patent
Jafarnia Jahromi et al.

(10) Patent No.: US 12,392,906 B2
(45) Date of Patent: Aug. 19, 2025

(54) DETECTION AND TERMINATION OF FAKE GNSS MEASUREMENTS IN THE PRESENCE OF INTERFERENCE

(71) Applicant: Samsung Electronics Co., Ltd., Suwon-si (KR)

(72) Inventors: Ali Jafarnia Jahromi, San Jose, CA (US); Francis Keith Scherrer, Traer, IA (US); Sundar Raman, Fremont, CA (US); William Joseph Higgins, Cedar Rapids, IA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 355 days.

(21) Appl. No.: 17/880,612

(22) Filed: Aug. 3, 2022

(65) Prior Publication Data

US 2023/0266479 A1    Aug. 24, 2023

Related U.S. Application Data

(60) Provisional application No. 63/313,254, filed on Feb. 23, 2022.

(51) Int. Cl.
*G01S 19/37* (2010.01)
*G01S 19/22* (2010.01)
*G01S 19/23* (2010.01)

(52) U.S. Cl.
CPC .............. *G01S 19/37* (2013.01); *G01S 19/22* (2013.01); *G01S 19/23* (2013.01)

(58) Field of Classification Search
CPC ........... G01S 19/37; G01S 19/22; G01S 19/23
USPC ..................................................... 342/357.42
See application file for complete search history.

(56) References Cited

U.S. PATENT DOCUMENTS

| 7,623,070 B2 | 11/2009 | Roh |
| 7,925,274 B2 | 4/2011 | Anderson et al. |
| 9,007,261 B2 | 4/2015 | Weng et al. |
| 2002/0049536 A1 | 4/2002 | Gaal |

(Continued)

FOREIGN PATENT DOCUMENTS

| CN | 104570022 A | * | 4/2015 | ............. G01S 19/37 |
| CN | 107121685 A | * | 9/2017 | |
| CN | 110673177 A | * | 1/2020 | |

(Continued)

*Primary Examiner* — Harry K Liu
(74) *Attorney, Agent, or Firm* — Renaissance IP Law Group LLP (57) ABSTRACT

A system and a method are disclosed for verifying a Global Navigation Satellite System (GNSS) space vehicle (SV) signal. An extremely weak frame synchronization (EWFS) verification process is run on a current SV signal with respect to another verified SV signal. An indication is set that frame synchronization for the current SV signal is complete after full frame synchronization occurs based on a peak EWFS correlation value of the current SV signal being equal to or greater than a first threshold. The indication may be set early based on the peak EWFS correlation value of the current SV signal being greater than a second threshold value that is greater than the first threshold. Tracking of the current SV signal may be terminated early based on the peak EWFS correction value of the current SV signal being less than a third threshold that is less that the first threshold.

20 Claims, 5 Drawing Sheets

(56) References Cited

U.S. PATENT DOCUMENTS

2015/0078249 A1    3/2015   Hoang et al.

FOREIGN PATENT DOCUMENTS

| CN | 106646548 B | * | 3/2020 | ............ G01S 19/33 |
| CN | 111366955 A | * | 7/2020 | ........... G01S 19/243 |
| CN | 116643299 A | * | 8/2023 | ............ G01S 19/22 |
| WO | 2005006593 A1 | | 1/2005 | |

* cited by examiner

DETECTION AND TERMINATION OF FAKE GNSS MEASUREMENTS IN THE PRESENCE OF INTERFERENCE

CROSS-REFERENCE TO RELATED APPLICATION

This application claims the priority benefit under 35 U.S.C. § 119(e) of U.S. Provisional Application No. 63/313,254, filed on Feb. 23, 2022, the disclosure of which is incorporated herein by reference in its entirety.

TECHNICAL FIELD

The subject matter disclosed herein relates to enhancing Global Navigation Satellite Systems (GNSS) measurements. More particularly, the subject matter disclosed herein relates to a system and a method for verifying a GNSS space vehicle (SV) signal based on a known bit pattern of an SV signal.

BACKGROUND

Some frequency bands of Long-Term Evolution (LTE) transmission, such as frequency bands B13 and B14, may generate a second harmonic that may interfere with L1 GNSS signals. There are also other interference signals that may interfere with L1 GNSS signals. In an interference situation, a GNSS receiver might acquire and track an interference component that appears to be a valid measurement and that is not detected as being invalid by normal impairment check techniques. If the interference component (referred to herein as a fake SV) is included in the output measurements, the interference component may cause a large position error that at times may be on the order of tens of kilometers. Fake SVs typically lack a structured bit content that is carried by legitimate GPS signals that may be verified in a tracking channel based on the bit content using weak frame synchronization (WFS) metrics.

SUMMARY

An example embodiment provides a method to verify a GNSS SV signal in which the method may include: synchronizing, by a GNSS receiver, one or more frames of a first SV signal of a first SV, being tracked by the GNSS receiver, using a subframe synchronization process; synchronizing, by the GNSS receiver, one or more frames of a second SV signal of a second SV, being tracked by the GNSS received, using a subframe synchronization verification process in which the subframe synchronization verification process is performed based at least in part on the first SV signal; and generating, by the GNSS receiver, frame synchronization data including an indication that full frame synchronization has occurred, the frame synchronization data generated being based at least in part on a comparison between a peak correlation value associated with the second SV signal and a first threshold value. In one embodiment, the comparison between the peak correlation value and the first threshold value includes determining that the second SV signal is equal to or greater than the first threshold value. In another embodiment, the comparison between the peak correlation value and the first threshold value may include determining that a bit error is less than or equal to a first time value, and a carrier-to-noise power density for the second SV signal is greater than a first power density level. In still another embodiment, the method may further include ending, by the GNSS receiver, subframe synchronization verification of the second SV signal after full frame synchronization occurs based, at least in part, on the peak correlation value associated with the second SV signal being less than the first threshold value. In yet another embodiment, ending subframe synchronization verification of the second SV signal may be further based on a bit error being greater than a first time value, and a carrier-to-noise power density for the second SV signal being less than or equal to a first power density level. In one embodiment, the method may further include generating, by the GNSS receiver, frame synchronization information including an indication that subframe synchronization verification for the second SV signal has occurred before full frame synchronization occurs based, at least in part, on the peak correlation value associated with the second SV signal being greater than a second threshold value, the second threshold value being greater than the first threshold value. In another embodiment, the indication that subframe synchronization verification for the second SV signal has occurred before full frame synchronization occurs may be further based on a bit error being less than or equal to a first time value, and a carrier-to-noise power density for the second SV signal being greater than a first power density level. In still another embodiment, the method may further include ending, by the GNSS receiver, subframe synchronization verification of the second SV signal before full frame synchronization occurs based on the peak correlation value associated with the second SV signal being less than a second threshold value that is less than the first threshold value, or based a bit error that is greater than a first time value.

An example embodiment provides a GNSS receiver that may include a front end circuit and a signal processing circuit. The front end circuit may be configured to receive a plurality of SV signals. The signal processing circuit may be configured to: synchronize a first SV signal of a first SV being tracked by the signal processing circuit using a subframe synchronization process, synchronize a second SV signal of a second SV with respect to the first SV signal using a subframe synchronization verification process, the second SV signal being tracked by the signal processing circuit, and generate frame synchronization data including an indication that full frame synchronization for the second SV signal has occurred in which the frame synchronization data generated may be based at least in part on a comparison between a peak correlation value associated with the second SV signal and a first threshold value. In one embodiment, generating frame synchronization data including the indication that full frame synchronization for the second SV signal has occurred may be based on determining that the second SV signal is equal to or greater than the first threshold value. In another embodiment, the signal processing circuit may be further configured to set the indication that subframe synchronization verification for the second SV signal is complete based on a bit error being less than or equal to a first time value, and a carrier-to-noise power density for the second SV signal being greater than a first power density level. In still another embodiment, the signal processing circuit may be configured to end subframe synchronization verification of the second SV signal after a full frame synchronization occurs based, at least in part, on the peak correlation value associated with the second SV signal being less than the first threshold value. In yet another embodiment, the signal processing circuit may be configured to end subframe synchronization verification of the second SV signal further based on a bit error being greater than a first time value, and a carrier-to-noise power density for the second SV signal being less than or equal to a first power density level. In one embodiment, the signal processing circuit may be further configured to set the indication that subframe synchronization verification for the second SV signal is complete before full frame synchronization occurs based, at least in part, on the peak correlation value associated with the second SV signal being greater than a second threshold value that is greater than the first threshold value. In another embodiment, the signal processing circuit may be configured to set the indication that subframe synchronization verification for the second SV signal is complete before full frame synchronization occurs further based on a bit error being less than or equal to a first time value, and a carrier-to-noise power density for the second SV signal being greater than a first power density threshold level. In still another embodiment, the signal processing circuit may be further configured to end subframe synchronization verification of the second SV signal before full frame synchronization occurs based on the peak correlation value associated with the second SV signal being less than a second threshold value that is less than the first threshold value, or based a bit error being greater than a first value. In yet another embodiment, the GNSS receiver may be configured to enable bit synchronization information to update system time of the GNSS in response to the indication that frame synchronization being set.

An example embodiment provides a GNSS receiver may include a front end circuit and a signal processing circuit. The front end circuit may be configured to receive a plurality of SV signals. The signal processing circuit may be configured to: run a subframe synchronization process on a first SV signal of a first SV being tracked by the signal processing circuit until frame synchronization occurs, run a subframe synchronization verification process on a second SV signal of a second SV with respect to the first SV signal, the second SV signal being tracked by the signal processing circuit, set an indication that subframe synchronization verification for the second SV signal is complete before full frame synchronization occurs based, at least in part, on a peak correlation value associated with the second SV signal being greater than a first threshold value, end subframe synchronization verification of the second SV signal before full frame synchronization occurs based on the peak correlation value associated with the second SV signal being less than a second threshold value that is less than the first threshold value, or based a bit error being greater than a first time value, set an indication that subframe synchronization verification for the second SV signal is complete after full frame synchronization occurs based, at least in part, on a peak correlation value associated with the second SV signal being equal to or greater than a third threshold value that is less than the first threshold value and greater than the second threshold value, and end subframe synchronization verification of the second SV signal after full frame synchronization occurs based, at least in part, on the peak correlation value associated with the second SV signal being less than the second threshold value. In one embodiment, the signal processing circuit may be configured to set the indication that subframe synchronization verification for the second SV signal is complete before full frame synchronization occurs further based on the bit error being less than or equal to a first time value, and a carrier-to-noise power density for the second SV signal being greater than a first power density level. In another embodiment, the signal processing circuit may be configured to set then indication that subframe synchronization verification for the second SV signal is complete after full frame synchronization occurs further based a current SV frame synchronization search window includes an expected boundary of the full frame synchronization.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The subject matter disclosed herein enhances validity of GNSS measurements using knowledge of known bits or known bit-transition patterns within a given GNSS subframe to provide significant improvements in the ability to detect and remove fake GNSS measurements from being included in a position and/or a velocity solution. In one embodiment, the verification process disclosed herein effectively removes fake measurements that may be generated by adjacent-band LTE transmissions and/or any other interference signal.

Conventional GNSS receivers perform a frame synchronization operation on one satellite vehicle (SV) and then may extend the frame synchronization of the SV to other SVs without any additional verification checks. The verification process disclosed herein improves conventional methods outlined above by utilizing subframe boundaries from SVs that have been previously determined to be frame-synced as accurate and performs a cross-satellite sub-frame (SF) boundary verification. The subframe boundary verification process disclosed herein checks for a known subframe bit transition pattern as well as timing of the pattern. A given SV is verified if the received signal from the SV shows a known bit-transition pattern within ±20 msec of other frame-synched SVs. The verification process disclosed herein may be performed with minimal extra computational complexity and without significant impact on Time-To-First-Fix (TTFF) performance or a loss of sensitivity.

The verification process disclosed herein includes an early-promotion process that may detect a valid GNSS measurement before a full subframe has been received, which also may minimize any adverse impact on TTFF performance. Additionally, an early-dismissal process may detect and terminate a fake measurement without requiring reception of a full subframe, thereby providing rapid resumption of a search for correct/additional GNSS signals. An additional check after receiving a full subframe may allow a comparison of the two largest correlation magnitudes over the course of the subframe to verify the validity of the measurement.

The disclosed verification process also provides selective disabling of other impairment checks to reduce an occurrence of false alarms associated with other impairment checks. That is, once a tracking channel has been verified, the probability of false alarms may be sufficiently low to confidently selectively disable other impairment checks relating to that tracking channel.

In order to prevent a fake SV from injecting invalid bitsync information into a GNSS receiver, the verification process disclosed herein validates a SV through a frame synchronization verification process before bitsync information may be enabled to update system time of the receiver. Thus, invalid measurements caused by interference signals are effectively prevented from being included in a position solution as interference signals usually do not pass subframe verification criteria disclosed herein. The entire verification process may be selectively set to be always on or selectively invoked based, for example, upon a presence of known GNSS interference sources.

Figure 1:
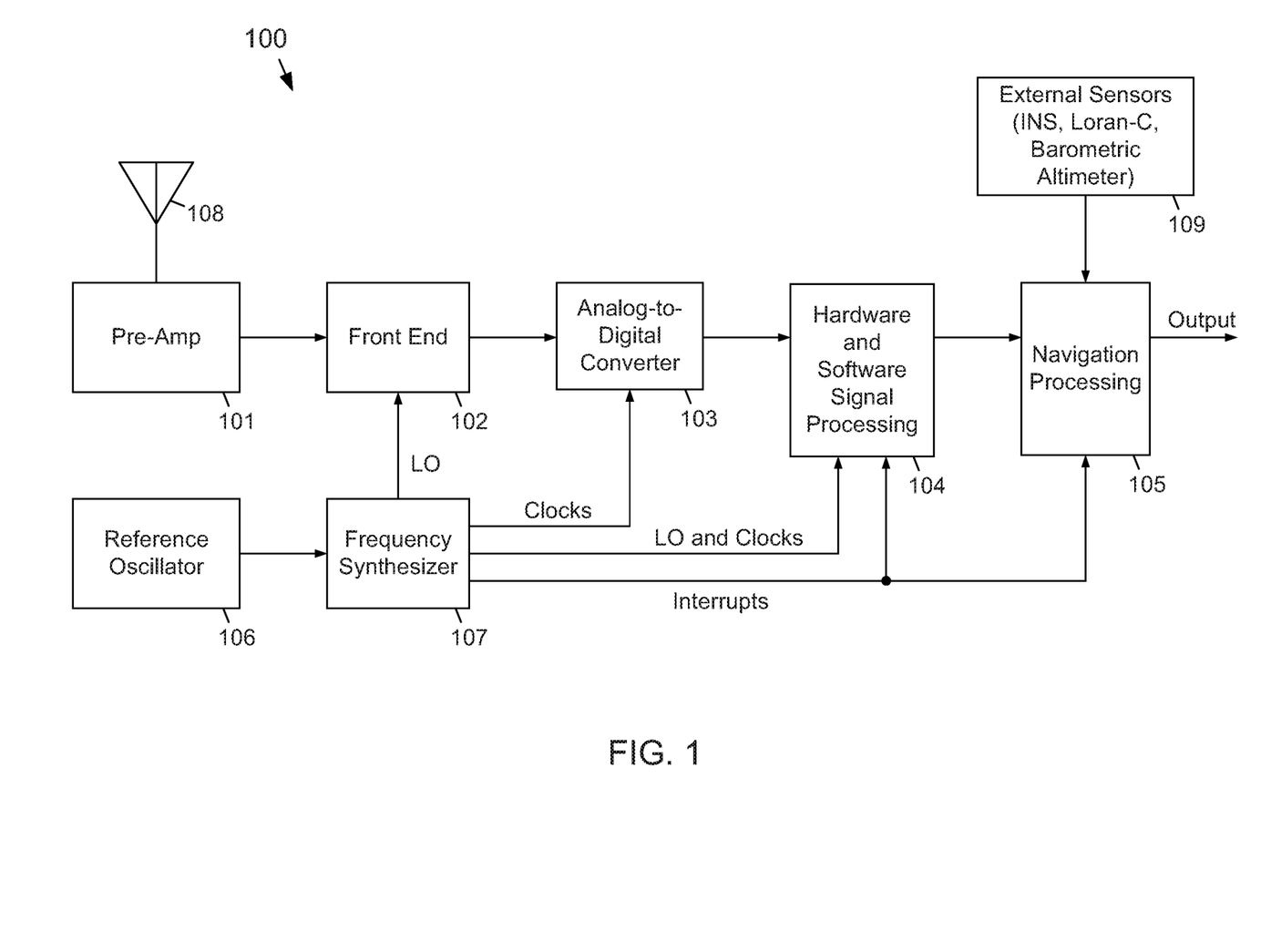
FIG. 1 is a block diagram of an example embodiment of a GNSS receiver that may validate GNSS measurements according to the subject matter disclosed herein.

FIG. 1 is a block diagram of an example embodiment of a GNSS receiver 100 that may validate GNSS measurements according to the subject matter disclosed herein. The GNSS receiver 100 includes a pre-amp circuit 101, a front end circuit 102, an analog-to-digital converter (ADC) circuit 103, a hardware/software (HW/SW) signal processing circuit 104, a navigation processing circuit 105, a reference oscillator circuit 106 and a frequency synthesizer circuit 107. An antenna 108 may be coupled to the pre-amp circuit 101 and receives GNSS signals from SVs (not shown). One or more external sensors 109, such as but not limited to an inertial navigation system (INS), Loran-C and/or a barometric altimeter, may be coupled to the navigation processing circuit 105. The example GNSS receiver 100 may include more or fewer components that are depicted in FIG. 1. In one embodiment, each of the various components depicted in FIG. 1 for the example GNSS receiver 100 may be formed from one or more modules.

The pre-amp circuit 101 amplifies and/or filters the GNSS signals received by the antenna 108. An output from the pre-amp circuit 101 may be input to the front end circuit 102 where the received GNSS signals may be downconverted to baseband signals. A reference oscillator circuit 106 may generate a reference frequency signal that is input to the frequency synthesizer circuit 107. The frequency synthesizer circuit 107 may output a local oscillator (LO) signal that is input to the front end circuit 102. The frequency synthesizer circuit 107 may also output other LO signals, clock signals and interrupt signals that are input to other components of the GNSS receiver 100.

The baseband signals output from the front end circuit 102 may be input to the ADC circuit 103 to convert the baseband signals to digital signals. The output of the ADC circuit 103 is input to the HW/SW signal processing circuit 104, which outputs determined and/or computed information, such as but not limited to, pseudoranges, delta ranges, carrier phase and navigation data. In addition to Weak Frame Synchronization (WFS) processing and Extremely Weak Frame Synchronization (EWFS) processing, the HW/SW signal processing circuit 104 may perform validation processing as disclosed herein. The navigation processing circuit 105 may use the outputs from the HW/SW signal processing circuit 104 to generate navigation-related information, such as but not limited to, position, velocity, time, and fault detection and isolation signals.

In one embodiment disclosed herein, EWFS metrics may be used to verify the legitimacy of a tracking channel and prevent fake SVs from appearing in output measurements. One embodiment of an EWFS metric is disclosed in U.S. Pat. No. 8,134,501 to Lennen et al., and is incorporated by reference herein. An assumption that may be made is that a fake SV does not carry the same sub-frame structure as is actually transmitted by a GPS satellite. Accordingly, the likelihood is a small (P=~0.01) that a fake SV shows a peak in a EWFS correlation magnitude at the same bit offset as the rest of the valid GPS SVs.

Figure 2:
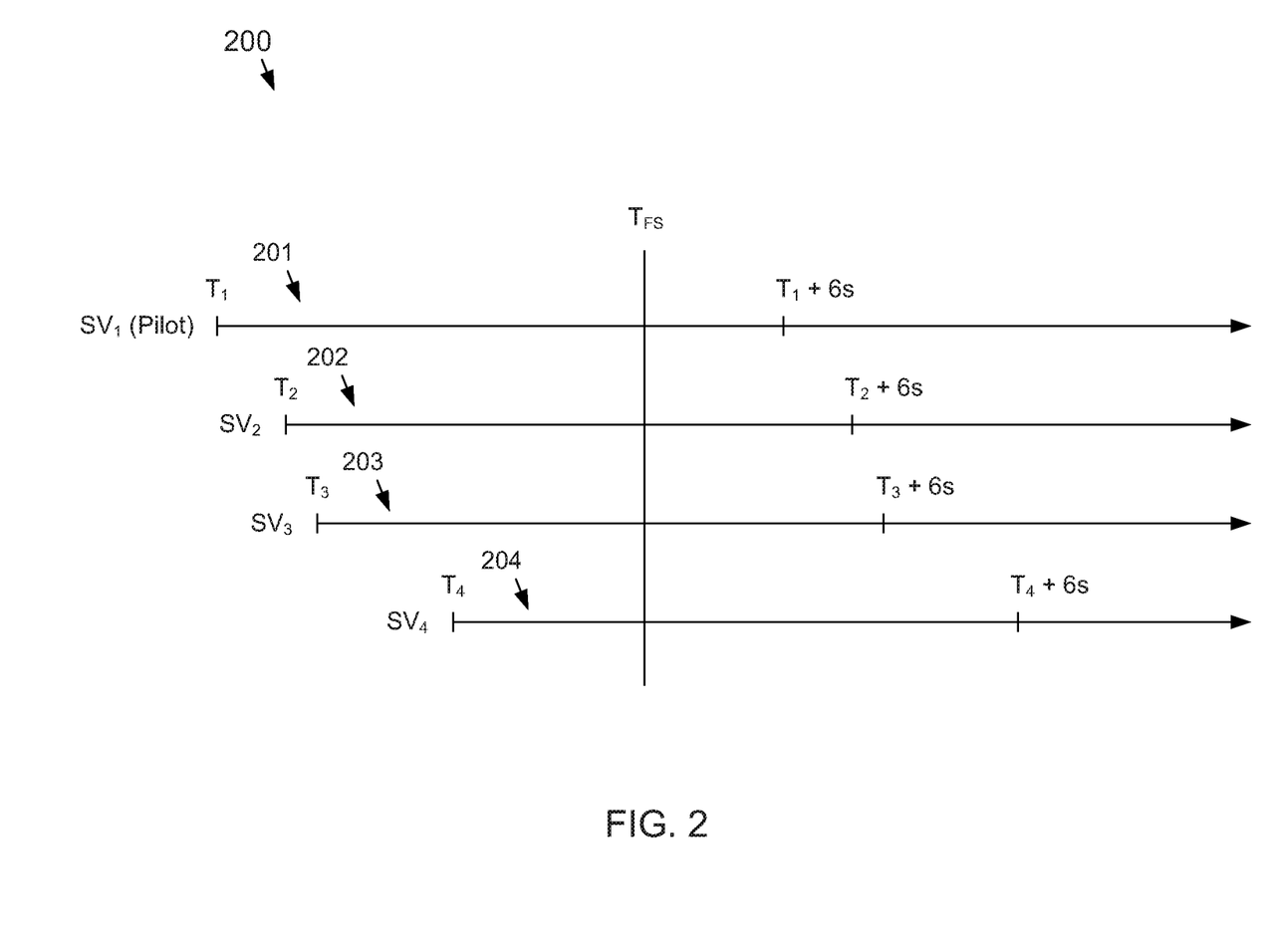
FIG. 2 depicts example tracking channel timelines for four different SVs.

FIG. 2 depicts example tracking channel timelines 200 for four different SVs. In FIG. 2, it has been assumed that a GNSS receiver, such as GNSS receiver 100, starts a first tracking channel 201 for $SV_1$ by running a weak frame synchronization algorithm in the HW/SW signal processing circuit 104, and reaches frame synchronization (frame sync) at time $T_{FS}$. Other SVs may also observe a subframe boundary within $T_{FS} \pm 20$ ms. As depicted in FIG. 2, the GNSS receiver has $SV_2$, $SV_3$ and $SV_4$ in tracking channels respectively indicated at 202-204, and is running a WFS algorithm for $SV_2$, $SV_3$ and $SV_4$. Each of the respective WFS algorithms may or may not meet a frame-synchronization pass criteria at time $T_{FS}$. In one embodiment, the weak frame-synchronization algorithm is, however, able to extend the frame synchronization information from one SV to other SVs if certain conditions are met.

In FIG. 2, time $T_1$ corresponds to the time that tracking channel 201 starts tracking $SV_1$. In the case of a GPS receiver, at time $T_1+6$ s, the tracking channel 201 for $SV_1$ would have received an entire subframe. At time $T_1+6$ s, logic in (for example) the HW/SW signal processing circuit 104 may be activated that indicates completion of a full subframe. A subframe synchronization algorithm (i.e., WFS or EWFS) may detect a subframe boundary ($T_{FS}$) at time $T_1+6$ s or sometime before $T_1+6$ s.

After detecting a subframe boundary ($T_{FS}$) on $SV_1$, additional checks may be applied before extending the frame synchronization information from $SV_1$ to the other SVs being tracked to prevent a fake SV setting of a SUBFRAME_SYNC_DONE flag. The additional checks ensure that all SVs in track are able to meet all of the three conditions described below before re-centering the track channel and inheriting a SUBFRAME_SYNC_DONE flag from $SV_1$. If a $SV_i$ (i≠1) is deemed to be fake, that is, the following three conditions are not met, the validation technique disclosed herein "kills," or terminates, the tracking for this "satellite" and resumes searching for the same satellite SV. That is, in one embodiment, "Early Dismissal" and/or "Early Promotion" logics may be implemented that may complete a decision process regarding SVs other than $SV_1$ before $T_i+6$ s.

The first condition is that the EWFS magnitude shows a correlation peak that is greater than a certain threshold. For early promotion, the value of the peak correlation is greater than a High_Thr before a full subframe has been received. That is, a peak correlation value greater than High_Thr that occurs after $T_{FS}$ and before $T_1+6$ s (i.e., $T_{FS}<t<T_1+6$ s) in which $T_1$ is the time of the tracking channel for the first $SV_1$. For a final decision, the peak correlation value is greater than a Low_Thr after receiving a full subframe (t=$T_i+6$ s). It should be noted that while reference has been made regarding the peak correlation value being greater than a Low_Thr after the reception of a full subframe as a decision metric, an additional decision criterion may include a comparison of the two largest correlation values over the course of the subframe.

The EWFS subframe verification thresholds described herein may be more relaxed than the original EWFS thresholds that are used for initial subframe synchronization (e.g., the thresholds that are used by $SV_1$ to find $T_{FS}$). In this case, the GNSS receiver already has access to $T_{FS}$ from other SVs that may be used for cross checking the subframe boundaries and reducing the probability of false verification. Therefore, the EWFS subframe verification thresholds may be set to allow a slightly larger false alarm rate. The exact values for the thresholds may depend on a tolerable false alarm rate and may be determined by closely examining H0 and H1 hypotheses at different CN0s. Herein, H0 corresponds to Probability Density Function (PDF) for Normalized EWFS Magnitude in the absence of correct subframe boundary (Fake SV). H1 corresponds to Probability Density Function (PDF) for Normalized EWFS Magnitude in the presence of correct subframe boundary (Valid SV). (see FIG. 4 for illustration).

The second condition is that the peak correlation value occurs within ±20 msec from the subframe boundary detected by $SV_1$.

The third condition is that the C/N0 is greater than Min_CN0 (e.g., 14 dB-Hz). In one embodiment, this verification process is used for SVs having a signal strength of between 14 dB-Hz and 22 dB-Hz, but it may be able to be extended to weaker or stronger SVs.

The validation process disclosed herein also includes an "Early Dismissal" mechanism that terminates tracking of a "SV signal" that has exhibited the correct sub frame boundary, but for which no correlation peak has been detected. The tracking will be also terminated based on an EWFS correlation magnitude at a correct bit offset±1 bit being less than a minimum acceptable threshold.

Figure 3:
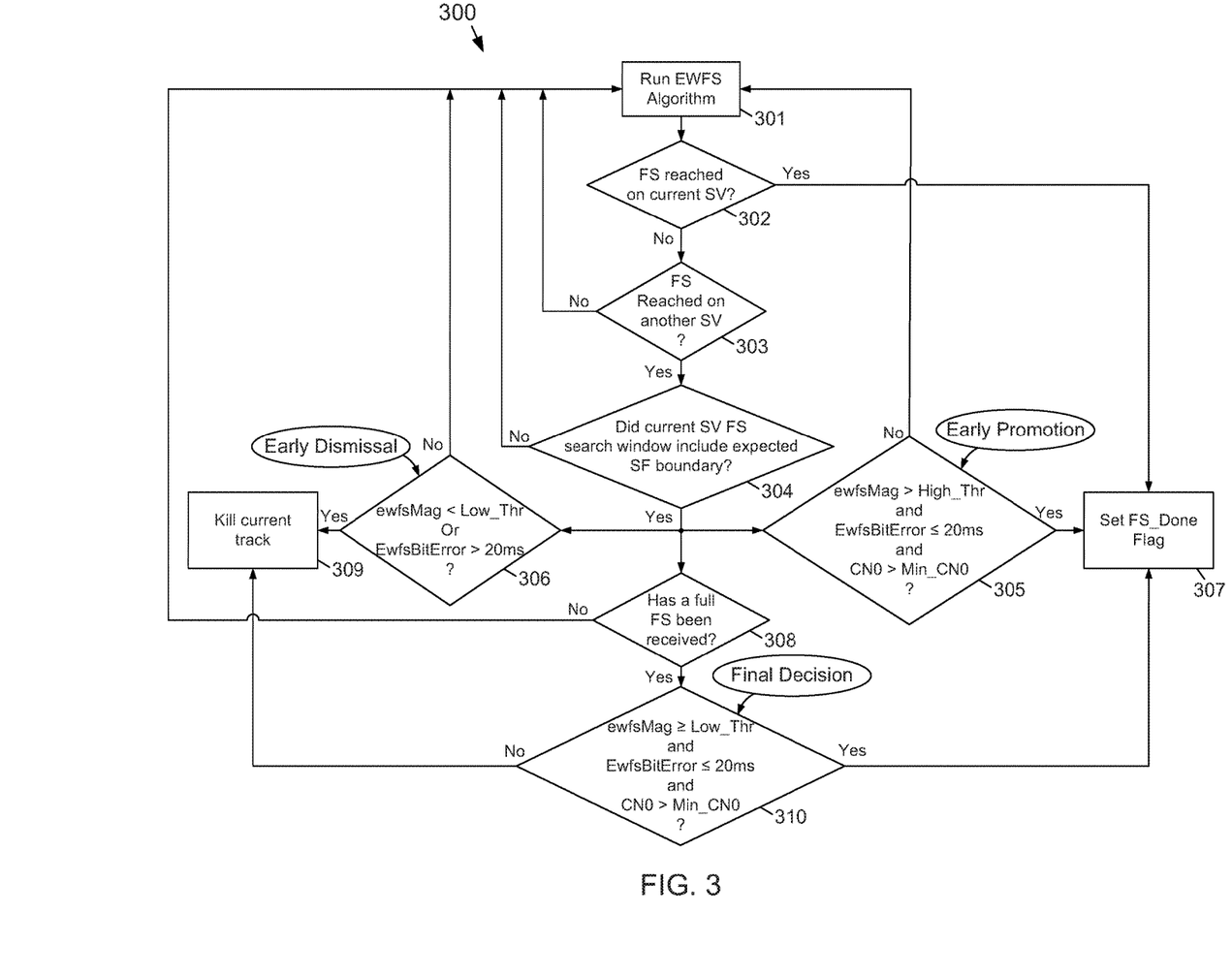
FIG. 3 is a flowchart of an example embodiment of a method for verifying GNSS measurements based on a known bit transition pattern within a given GNSS subframe according to the subject matter disclosed herein.

FIG. 3 is a flowchart of an example embodiment of a method 300 for verifying GNSS measurements based on a known bit-transition pattern within a given GNSS subframe according to the subject matter disclosed herein. In one embodiment, the method 300 may be performed, for example, in the HW/SW signal processing circuit 104 of the example embodiment of the GNSS receiver 100.

The method begins at 301 where the HW/SW processing circuit 104 runs an EWFS algorithm on a SV signal being tracked. Flow continues to 302 where the HW/SW processing circuit 104 determines whether frame synchronization (FS) has occurred. If so, flow continues to 307 where a FS_Done flag is set. In one embodiment, the FS_DONE flag indicates that current SV has successfully performed subframe boundary verification and therefore the SV is a legitimate SV.

If, at 302, it is determined that frame synchronization has not occurred, flow continues to 303 where the HW/SW processing circuit 104 determines whether frame synchronization has occurred for another SV in track. If not, flow returns to 301.

If, at 303, it is determined that frame synchronization has occurred for another SV, flow continues to 304 where the HW/SW processing circuit determines whether the current SV frame synchronization search window includes the expected frame synchronization boundary. If not, flow returns to 301.

If, at 304, it is determined that the current SV frame synchronization search window includes the expected frame synchronization boundary, flow continues to 305, 306 and 308, which may be processed in parallel.

At 305, the HW/SW processing circuit 104 determines whether the three conditions have been met for early promotion. That is, the HW/SW processing circuit 104 determines whether ewfsMag>High_Thr, EwfsBitError<20 msec, and CN0>Min_CN0 in which High_Thr is the ewfsMag value that allows subframe verification before receiving a full subframe, EwfsBitError is the time difference between ewfsBit of the current SV and the correct SF boundary detected by another SV, ewfsBit is the bit offset corresponding to ewfsMag, and Min_CN0 is the minimum CN0 value for which subframe verification for an SV may be performed. Additionally, after a full subframe (SF) has been examined, ewfsBit is expected to show the correct subframe boundary. Assuming a normalized EWFS magnitude, the subframe synchronization threshold that is used by $SV_1$ may be around 0.7, while the High_Thr for EWFS verification that is used by other SVs may be around 0.5, and the Low-Thr may be around 0.3. (see FIG. 4 for illustration).

If, at 305, the HW/SW signal processing circuit 104 determines that the three conditions have been met, flow continues to 307 where the FS_Done flag is set for the current SV track. If, at 305, it is determined that the three conditions have not been met, flow returns to 301.

At 306, the HW/SW signal processing circuit 104 determines whether ewfsMag<Low_Thr or EwfsBitError>20 msec for early dismissal, in which Low_Thr is the minimum acceptable ewfsMag value for subframe verification after receiving a full subframe, and ewfsMag is the maximum value of the extremely weak frame synchronization (EWFS) correlation magnitude within the current subframe. If so, flow continues to 309, where the current track is terminated. If not, flow returns to 301.

At 308, the HW/SW signal processing circuit 104 determines whether a full frame synchronization has been received. If not, flow returns to 301. If so, flow continues to 310 where the HW/SW signal processing circuit 104 determines as a final decision whether ewfsMag≥Low_Thr and EwfsBitError≤20 msec, and CN0>Min_CN0. If so, flow continues to 307 where the FS_Done flag is set. If not, flow continues to 309 where the current tracking is terminated.

The thresholds used herein should be selected so that a small error rate (e.g., $10^{-4}$) be obtained when verifying a subframe. In order to do so, the following considerations may be taken into account.

An ewfsBit Agreement parameter should be selected so that ewfsBitError≤20 msec. The verification process disclosed herein may have a maximum magnitude of the EWFS metric occurring within ±20 msec from a previously detected SF boundary. This means than for a given GPS subframe that includes 300 bits, there are only 3 bit offsets acceptable for subframe verification. Therefore, a fake SV would only have a 1% chance of being verified as a legitimate SV and having the FS_DONE flag set.

The High_Thr threshold may be determined based on the ewfsBit Agreement parameter provides a false verification rate of $10^{-2}$ or smaller. Accordingly, High_Thr (the early-promotion threshold) should be selected so that High_Thr also provides another level of false verification immunity equal to $10^{-2}$ or smaller.

For the Low_Thr threshold, if for a given SV a subframe is not able to be verified by early promotion mechanism (i.e., passing High_Thr before the end of subframe), another check may be performed once a full subframe is received. Upon reception of a full frame synchronization, the maximum EWFS magnitude may be compared over that past 300 bits to Low_Thr. The value of this threshold should be chosen so that it provides a false subframe verification rate of $10^{-2}$ that will be then combined with the ewfsBit Agreement parameter and provide the desired false verification rate.

The Min_CN0 threshold indicates the minimum CN0 value that may be run for the sub-frame verification process disclosed herein based on the EWFS metric. Based on log files that have been processed, more than 98.7% of subframe verifications occur at CN0>14 dB-Hz. On the other hand, false FS verifications may occur for SV power that is around 13 dB-Hz. Consequently, it may be reasonable to limit EWFS verifications to signals that are stronger than 14 dB-Hz.

Figure 4:
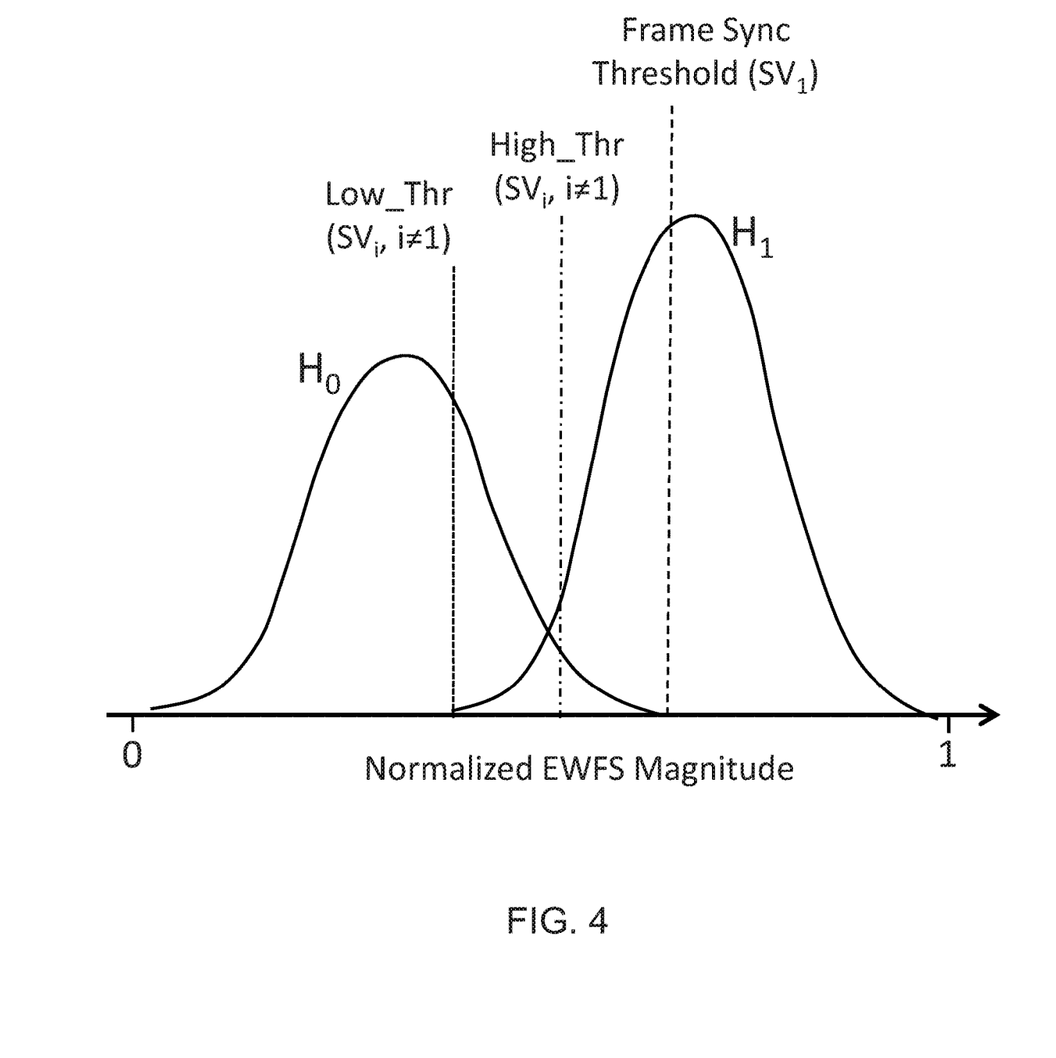
FIG. 4 depicts example H0 and H1 hypotheses and example detection thresholds for EWFS subframe verification according to the subject matter disclosed herein.

FIG. 4 depicts example H0 and H1 hypotheses and example detection thresholds for EWFS subframe verification according to the subject matter disclosed herein. In FIG. 4, H0 corresponds to a Probability Density Function (PDF) for a Normalized EWFS Magnitude in the absence of correct subframe boundary (Fake SV). H1 corresponds to Probability Density Function (PDF) for Normalized EWFS Magnitude in the presence of correct subframe boundary (Valid SV).

Figure 5:
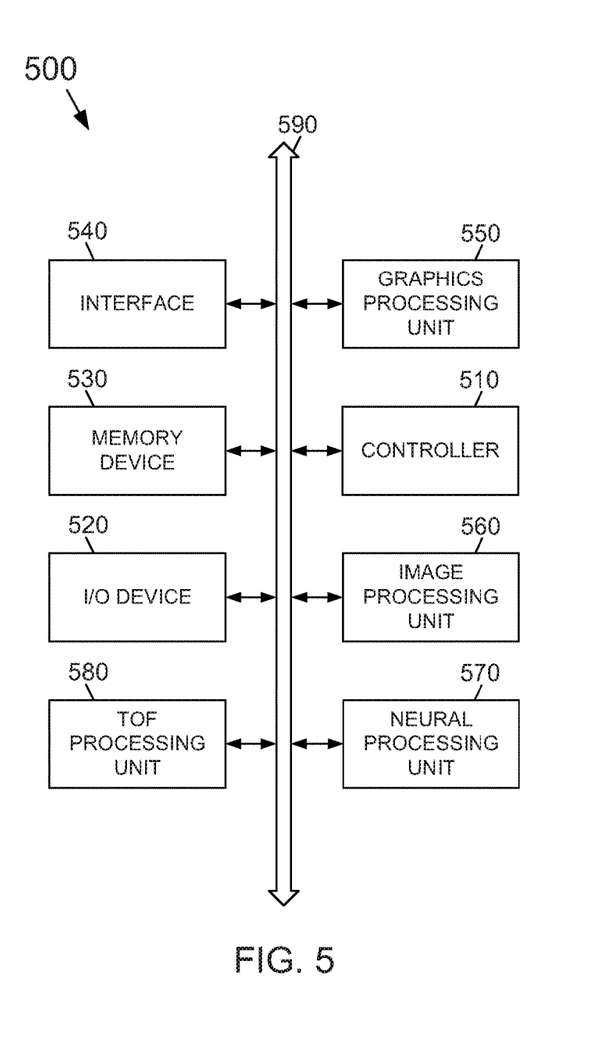
FIG. 5 depicts an electronic device that in one embodiment may include a GNSS receiver that includes a verification process according to the subject matter disclosed herein.

FIG. 5 depicts an electronic device 500 that in one embodiment may include a GNSS receiver that includes a verification process according to the subject matter disclosed herein. The electronic device 500 may include a controller (or CPU) 510, an input/output device 520 such as, but not limited to, a keypad, a keyboard, a display, a touch-screen display, a 2D image sensor, a 3D image sensor, a memory 530, an interface 540, a GPU 550, an imaging-processing unit 560, a neural processing unit 570, a TOF processing unit 580 that are coupled to each other through a bus 590. The controller 510 may include, for example, at least one microprocessor, at least one digital signal processor, at least one microcontroller, or the like. The memory 530 may be configured to store a command code to be used by the controller 510 and/or to store a user data.

The interface 540 may be configured to include a wireless interface that is configured to transmit data to or receive data from, for example, a wireless communication network using a RF signal. In another embodiment, the interface 540 may include a GNSS receiver that includes a verification process according to the subject matter disclosed herein. The interface 540 may also include, for example, an antenna. The electronic device 500 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multi-channel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method to verify a Global Navigation Satellite System (GNSS) space vehicle (SV) signal, the method comprising:

synchronizing, by a GNSS receiver, one or more frames of a first SV signal of a first SV, being tracked by the GNSS receiver, using a subframe synchronization process;

synchronizing, by the GNSS receiver, one or more frames of a second SV signal of a second SV, being tracked by the GNSS received, using a subframe synchronization verification process, the subframe synchronization verification process being performed based at least in part on the first SV signal; and generating, by the GNSS receiver, frame synchronization data including an indication that full frame synchronization has occurred, the frame synchronization data generated being based at least in part on a comparison between an Extremely Weak Frame Synchronization (EWFS) peak correlation value associated with the second SV signal and a first threshold value.

2. The method of claim 1, wherein the comparison between the peak correlation value and the first threshold value includes determining that the second SV signal is equal to or greater than the first threshold value.

3. The method of claim 1, wherein the comparison between the peak correlation value and the first threshold value comprises determining that a bit error is less than or equal to a first time value, and a carrier-to-noise power density for the second SV signal is greater than a first power density level.

4. The method of claim 1, further comprising ending, by the GNSS receiver, subframe synchronization verification of the second SV signal after full frame synchronization occurs based, at least in part, on the peak correlation value associated with the second SV signal being less than the first threshold value.

5. The method of claim 4, wherein ending subframe synchronization verification of the second SV signal is further based on a bit error being greater than a first time value, and a carrier-to-noise power density for the second SV signal being less than or equal to a first power density level.

6. The method of claim 1, further comprising generating, by the GNSS receiver, frame synchronization information including an indication that subframe synchronization verification for the second SV signal has occurred before full frame synchronization occurs based, at least in part, on the peak correlation value associated with the second SV signal being greater than a second threshold value, the second threshold value being greater than the first threshold value.

7. The method of claim 6, wherein the indication that subframe synchronization verification for the second SV signal has occurred before full frame synchronization occurs is further based on a bit error being less than or equal to a first time value, and a carrier-to-noise power density for the second SV signal being greater than a first power density level.

8. The method of claim 1, further comprising ending, by the GNSS receiver, subframe synchronization verification of the second SV signal before full frame synchronization occurs based on the peak correlation value associated with the second SV signal being less than a second threshold value that is less than the first threshold value, or based a bit error that is greater than a first time value.

9. A Global Navigation Satellite System (GNSS) receiver, comprising:
  a front end circuit configured to receive a plurality of space vehicle (SV) signals; and
  a signal processing circuit configured to:
    synchronize a first SV signal of a first SV being tracked by the signal processing circuit using a subframe synchronization process,
    synchronize a second SV signal of a second SV with respect to the first SV signal using a subframe synchronization verification process, the second SV signal being tracked by the signal processing circuit, and
    generate frame synchronization data including an indication that full frame synchronization for the second SV signal has occurred, the frame synchronization data generated being based at least in part on a comparison between a between an Extremely Weak Frame Synchronization (EWFS) peak correlation value associated with the second SV signal and a first threshold value.

10. The GNSS receiver of claim 9, wherein generating frame synchronization data including the indication that full frame synchronization for the second SV signal has occurred is based on determining that the second SV signal is equal to or greater than the first threshold value.

11. The GNSS receiver of claim 9, wherein the signal processing circuit is further configured to set the indication that subframe synchronization verification for the second SV signal is complete based on a bit error being less than or equal to a first time value, and a carrier-to-noise power density for the second SV signal being greater than a first power density level.

12. The GNSS receiver of claim 9, wherein the signal processing circuit is configured to end subframe synchronization verification of the second SV signal after a full frame synchronization occurs based, at least in part, on the peak correlation value associated with the second SV signal being less than the first threshold value.

13. The GNSS receiver of claim 12, wherein the signal processing circuit is configured to end subframe synchronization verification of the second SV signal further based on a bit error being greater than a first time value, and a carrier-to-noise power density for the second SV signal being less than or equal to a first power density level.

14. The GNSS of claim 9, wherein the signal processing circuit is further configured to set the indication that subframe synchronization verification for the second SV signal is complete before full frame synchronization occurs based, at least in part, on the peak correlation value associated with the second SV signal being greater than a second threshold value that is greater than the first threshold value.

15. The GNSS receiver of claim 14, wherein the signal processing circuit is configured to set the indication that subframe synchronization verification for the second SV signal is complete before full frame synchronization occurs further based on a bit error being less than or equal to a first time value, and a carrier-to-noise power density for the second SV signal being greater than a first power density threshold level.

16. The GNSS receiver of claim 9, wherein the signal processing circuit is further configured to end subframe synchronization verification of the second SV signal before full frame synchronization occurs based on the peak correlation value associated with the second SV signal being less than a second threshold value that is less than the first threshold value, or based a bit error being greater than a first value.

17. The GNSS receiver of claim 9, wherein the GNSS receiver is configured to enable bit synchronization information to update system time of the GNSS in response to the indication that frame synchronization being set.

18. A Global Navigation Satellite System (GNSS) receiver, comprising:
  a front end circuit configured to receive a plurality of space vehicle (SV) signals; and
  a signal processing circuit configured to:
    run a subframe synchronization process on a first SV signal of a first SV being tracked by the signal processing circuit until frame synchronization occurs,
    run a subframe synchronization verification process on a second SV signal of a second SV with respect to the first SV signal, the second SV signal being tracked by the signal processing circuit, set an indication that subframe synchronization verification for the second SV signal is complete before full frame synchronization occurs based, at least in part, on a peak correlation value associated with the second SV signal being greater than a first threshold value, end subframe synchronization verification of the second SV signal before full frame synchronization occurs based on the peak correlation value associated with the second SV signal being less than a second threshold value that is less than the first threshold value, or based a bit error being greater than a first time value, set an indication that subframe synchronization verification for the second SV signal is complete after full frame synchronization occurs based, at least in part, on a peak correlation value associated with the second SV signal being equal to or greater than a third threshold value that is less than the first threshold value and greater than the second threshold value, and end subframe synchronization verification of the second SV signal after full frame synchronization occurs based, at least in part, on the peak correlation value associated with the second SV signal being less than the second threshold value.

19. The GNSS receiver of claim 18, wherein the signal processing circuit is configured to set the indication that subframe synchronization verification for the second SV signal is complete before full frame synchronization occurs further based on the bit error being less than or equal to a first time value, and a carrier-to-noise power density for the second SV signal being greater than a first power density level.

20. The GNSS receiver of claim 18, wherein the signal processing circuit is configured to set then indication that subframe synchronization verification for the second SV signal is complete after full frame synchronization occurs further based a current SV frame synchronization search window includes an expected boundary of the full frame synchronization.

* * * * *